(12) United States Patent
Batchelder et al.

(10) Patent No.: US 12,467,723 B2
(45) Date of Patent: *Nov. 11, 2025

(54) PROPORTIONAL-RESPONSE CONDUCTIVE ENERGY WEAPON AND METHOD

(71) Applicant: Convey Technology, Inc., Woodinville, WA (US)

(72) Inventors: J. Samuel Batchelder, Woodinville, WA (US); Cynthia T. Batchelder, Woodinville, WA (US)

(73) Assignee: CONVEY TECHNOLOGY, INC., Somers, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,674

(22) Filed: Jun. 7, 2024

(65) Prior Publication Data

US 2024/0328758 A1    Oct. 3, 2024

Related U.S. Application Data

(63) Continuation of application No. 17/611,734, filed as application No. PCT/US2020/033492 on May 18, 2020, now Pat. No. 12,018,918.

(60) Provisional application No. 62/848,903, filed on May 16, 2019.

(51) Int. Cl.
*F41H 13/00* (2006.01)

(52) U.S. Cl.
CPC ..... *F41H 13/0025* (2013.01); *F41H 13/0018* (2013.01)

(58) Field of Classification Search
CPC .......... F41H 13/0025; F41H 13/0018

USPC .......... 361/232
See application file for complete search history.

(56) References Cited

U.S. PATENT DOCUMENTS

| | | | |
|---|---|---|---|
| 8,843 | A | 3/1852 | Sonnenburg |
| 253,315 | A | 2/1882 | Sanford |
| 2,805,067 | A | 9/1957 | Ryan |
| 3,374,708 | A | 3/1968 | Wall |
| 3,803,436 | A | 4/1974 | Morrell |
| 3,971,292 | A | 7/1976 | Paniagua |
| 4,006,390 | A | 2/1977 | Levine |
| 4,424,932 | A | 1/1984 | Allen |

(Continued)

FOREIGN PATENT DOCUMENTS

| | | |
|---|---|---|
| WO | 2006134596 A2 | 12/2006 |
| WO | 2020162997 A2 | 8/2020 |
| WO | 2020236761 A2 | 11/2020 |

OTHER PUBLICATIONS

International Search Report and Written Opinion of PCT/2019/060774, mailed Sep. 15, 2020; 12 pages.

(Continued)

*Primary Examiner* — Yemane Mehari
(74) *Attorney, Agent, or Firm* — Westman, Champlin & Koehler, P.A.

(57) ABSTRACT

A method of delivering an electric charge to a remote target with a CEW includes using one or more sensors in communication with the CEW to determine a threat level of a situation and contacting the target with at least one electrode wire discharged from the CEW. The method further includes applying an electric charge along the at least one electrode wire so that electrical charge flows between the CEW and the remote target based upon the determined threat level of the situation.

20 Claims, 10 Drawing Sheets

(56) References Cited

U.S. PATENT DOCUMENTS

| | | |
|---|---|---|
| 4,719,534 A | 1/1988 | Ward |
| 4,846,044 A | 7/1989 | Lahr |
| 4,852,454 A | 8/1989 | Batchelder |
| 4,893,815 A | 1/1990 | Rowan |
| 5,103,366 A | 4/1992 | Battochi |
| 5,225,623 A | 7/1993 | Krasnow |
| 5,409,638 A | 4/1995 | Battochi |
| 5,457,597 A | 10/1995 | Rothschild |
| 5,473,501 A | 12/1995 | Claypool |
| 5,625,525 A | 4/1997 | Coakley et al. |
| 5,654,867 A | 8/1997 | Murray |
| 5,675,103 A | 10/1997 | Herr |
| 5,698,815 A | 12/1997 | Ragner |
| 5,786,546 A | 7/1998 | Simson |
| 5,936,183 A | 8/1999 | McNulty, Sr. |
| 5,955,695 A | 9/1999 | McNulty, Sr. |
| 5,962,806 A | 10/1999 | Coakley et al. |
| 6,022,120 A | 2/2000 | Chang |
| 6,272,781 B1 | 8/2001 | Resnick |
| 6,636,412 B2 | 10/2003 | Smith |
| 6,643,114 B2 | 11/2003 | Stethem |
| 6,679,180 B2 | 1/2004 | Warnagiris et al. |
| 6,862,994 B2 | 3/2005 | Chang |
| 6,898,887 B1 | 5/2005 | Stratbucker |
| 7,042,696 B2 | 5/2006 | Smith et al. |
| 7,075,770 B1 | 7/2006 | Smith |
| 7,237,352 B2 | 7/2007 | Keely et al. |
| 7,314,007 B2 | 1/2008 | Su |
| 7,336,472 B2 | 2/2008 | Nerheim et al. |
| 7,350,466 B2 | 4/2008 | Hendrix |
| 7,363,742 B2 | 4/2008 | Nerheim |
| 7,421,933 B1 | 9/2008 | Pearson |
| 7,457,096 B2 | 11/2008 | Brundula |
| 7,520,081 B2 | 4/2009 | Kroll |
| 7,570,476 B2 | 8/2009 | Nerheim |
| 7,586,733 B2 | 9/2009 | Nerheim |
| 7,600,337 B2 | 10/2009 | Nerheim et al. |
| 7,602,597 B2 | 10/2009 | Smith et al. |
| 7,676,972 B2 | 3/2010 | Smith et al. |
| 7,701,692 B2 | 4/2010 | Smith et al. |
| 7,736,237 B2 | 6/2010 | Stethem et al. |
| 7,782,592 B2 | 8/2010 | Nerheim |
| 7,800,885 B2 | 9/2010 | Brundula et al. |
| 7,944,676 B2 | 5/2011 | Smith et al. |
| 7,984,579 B2 | 7/2011 | Brundula et al. |
| 8,087,335 B2 | 1/2012 | Shekarri |
| 8,166,693 B2 | 5/2012 | Hughes et al. |
| 8,277,328 B2 | 10/2012 | Stethem et al. |
| 8,321,474 B2 | 11/2012 | Schilken |
| 8,549,783 B2 | 10/2013 | Marquez |
| 8,572,876 B2 | 11/2013 | Shekarri et al. |
| 8,594,485 B2 | 11/2013 | Brundula |
| 8,743,527 B2 | 6/2014 | Brundula |
| 8,837,901 B2 | 9/2014 | Shekarri et al. |
| 9,025,304 B2 | 5/2015 | Brundula et al. |
| 9,058,499 B1 | 6/2015 | Smith |
| 9,182,193 B1 | 11/2015 | Nerheim |
| 9,395,147 B2 | 7/2016 | Gagnon et al. |
| 9,400,155 B2 | 7/2016 | Bradshaw et al. |
| 9,518,727 B1 | 12/2016 | Markle et al. |
| 9,642,131 B2 | 5/2017 | Bohlander et al. |
| 10,011,247 B2 | 7/2018 | Joao |
| 10,015,871 B2 | 7/2018 | Handel et al. |
| 10,024,636 B2 | 7/2018 | Nerheim |
| 10,054,405 B2 | 8/2018 | Alherimi |
| 10,082,361 B2 | 9/2018 | Forsythe et al. |
| 2009/0183413 A1 | 7/2009 | Smith |
| 2013/0208392 A1 | 8/2013 | Brundula et al. |
| 2015/0153144 A1* | 6/2015 | Cheatham, III .... F41H 13/0025 361/232 |
| 2016/0284182 A1 | 9/2016 | Havens |
| 2017/0241753 A1 | 8/2017 | Nerheim |
| 2017/0245355 A1 | 8/2017 | Handel et al. |
| 2018/0158305 A1 | 6/2018 | Noland et al. |
| 2018/0187999 A1 | 7/2018 | Tremblay et al. |
| 2018/0259303 A1* | 9/2018 | Nerheim ............. F41H 13/0025 |
| 2018/0268674 A1 | 9/2018 | Siminoff |
| 2019/0376768 A1* | 12/2019 | Nerheim ............. F41H 13/0025 |
| 2021/0389102 A1 | 12/2021 | Batchelder |
| 2022/0236027 A1 | 7/2022 | Howard et al. |
| 2023/0040922 A1 | 2/2023 | Howard et al. |

OTHER PUBLICATIONS

International Search Report and Written Opinion of PCT/US2020/033492 mailed Dec. 18, 2020; 8 pages.

Jones, Nathaniel J. "Extruding Indium Wire" (2016) Retrieved from https://hydrogen.wsu.edu/2016/07/08/extruding-indium-wire/; 12 pages.

Assael et al., "Reference Data for the Density and Viscosity of Liquid Cadmium, Cobalt, Gallium, Indium, Mercury, Silicon, Thallium, and Zinc" J. Phys. Chem. Ref. Data, vol. 41, No. 3, 2012; 16 pages.

Fais, Alessandro, "Why is it not possible to strain harden Indium?" Retrieved from https://www.quora.com/Why-is-it-not-possible-to-strain-harden-Indium; 1 page.

Lee, Gyuhyon et al., "Plastic deformation of indium nanostructures" vol. 528, Issues 19-20, 2011, pp. 6112-6120; ISSN 0921-5093. Retrieved from https://www.sciencedirect.com/science/article/pii/S0921509311004977; 8 pages.

Axon Product information relating to the TASER Pulse. Retrieved from https://taser.com/products/taser-pulse on May 7, 2021.

First Examination Report mailed Oct. 26, 2022 for corresponding Indian Patent Application No. 202127017434, filed Apr. 14, 2021.

International Search Report and Written Opinion of PCT/US2020/033492, filed May 18, 2020.

Preliminary Office Action received from the Brazilian Patent Office for Brazilian Application No. 112021007890-8, dated Apr. 11, 2023.

First Japanese Office Action from corresponding application No. 2021-568684 mailed Dec. 18, 2023.

Prosecution history from corresponding U.S. Appl. No. 17/611,734, filed Nov. 16, 2021 including: Non-Final Rejection mailed Apr. 13, 2023, Final Rejection mailed Oct. 24, 2023, Advisory Action mailed Dec. 20, 2023, Advisory Action mailed Jan. 26, 2024, Notice of Allowance mailed Feb. 28, 2024, Notice of Allowance mailed Mar. 13, 2024; and Notice of Allowance mailed Mar. 27, 2024.

* cited by examiner

*Prior Art*

PROPORTIONAL-RESPONSE CONDUCTIVE ENERGY WEAPON AND METHOD

CROSS-REFERENCE TO RELATED APPLICATION

This Application is a continuation of U.S. patent application Ser. No. 17/611,734, filed Nov. 16, 2021, which is a Section 371 National Stage Application of International Application No. PCT/US2020/033492, filed May 18, 2020 and published as WO 2020/236761 A9 on Nov. 26, 2020, in English, which claims the benefit of U.S. Provisional Application Ser. No. 62/848,903 which was filed May 16, 2019; the contents of all of which are hereby incorporated by reference in their entirety.

BACKGROUND

The present disclosure relates to a hand-held device that is configured to assess a threat with one or more sensors and deliver an electric charge to a target whose efficacy is proportional to the assessed threat. More particularly, the present disclosure relates to a hand-held device configured to discharge a plurality of electrode wires and deliver a non-lethal amount of electric energy proportional to the threat as assessed by the one or more sensors.

Non-lethal devices that impart an incapacitating amount of electricity, commonly referred to as conductive energy weapons (CEWS), are used by many law enforcement and military forces. A 24,000-use case study shows that the use of CEWS shows a 60% reduction in suspect injury relative to use of conventional weapons.

A common CEW is sold under the TASER® by Axon Enterprise, Inc. located in Scottsdale, Arizona. A TASER® CEW delivers current using two darts, propelled by gunpowder or springs, each of which tows insulated wire from spools in the launcher. Typical pistol style launchers have two pairs of darts, and a 15 ft to 30 ft effective range.

There are other CEWs that utilize liquid or molten conductive beams. However, the ionic conductors (like salt water) generally have too much resistivity to carry the relatively high required peak currents.

Metal alloys that are molten at ambient temperature (NaK, mercury, gallium) are generally corrosive, poisonous, and/or expensive. The beams they form generally break up by Rayleigh instability.

Metal alloys that are molten above ambient temperature can be extruded to freeze in flight; such beams tend to shatter as air drag slows them down. Further, maintaining reservoirs of alloy at elevated temperature in a standby mode requires a significant amount of energy to compensate for heat loss. Such a hand-held device will require a significant amount of volume for insulation. Both are problematic for a portable design.

Other CEWS that transmit electric energy to a target include a rigid baton or probe. In some instances, the baton or probe can telescope to increase the range. However, the range of a rigid CEW is generally within the engagement range of the target individual, and they can be grasped by a potential target.

Finally, in some instances the CEWS can utilize a laser to ionize one or more conductive channels in the air. However, the laser based CEWS are expensive, potentially lethal and blinding, and in many instances impractical.

Whatever the previously disclosed CEWS, each CEW lacks one or more sensors that are configured to assess a threat and adjust an electric charge based upon the sensed or assessed threat. The one or more sensors can be utilized to adjust the electric charge through the full range of threats from a mildly aggressive or self-dangerous offender that would require a less aggressive charge to overwhelmingly aggressive opponents threatening the imminent death of the operator which would require a maximally aggressive amount of electric charge to incapacitate the person.

SUMMARY

This disclosure, in its various combinations, either in apparatus or method form, may also be characterized by the following listing of items:

An aspect of the present disclosure relates to a method of delivering an electric charge to a remote target with a CEW. The method includes using one or more sensors in communication with the CEW to determine a threat level of a situation and contacting the target with at least one electrode wire discharged from the CEW. The method further includes applying an electric charge along the at least one electrode wire so that electrical charge flows between the CEW and the remote target based upon the determined threat level of the situation.

In some embodiments, the CEW is equipped with a controller that provides feedback to the controller regarding the sensed threat and/or the effectiveness of the CEW. In some embodiments, the controller can send feedback of effectiveness of the CEW by providing signals regarding physical inputs, such as pressure, to the controller such as through the use of a joystick.

Another aspect of the present disclosure includes a method of delivering an electric charge to a remote target with a CEW. The method includes using one or more sensors in communication with the CEW to determine a threat level of a situation. The method includes pressurizing a reservoir of metallic conductor initially at a temperature below its melting point, and flowing the metallic conductor through an orifice to form a continuous wire with axial velocity, so that a user might direct the axial velocity of the wire to intercept the remote target. The method includes applying an electric charge along the wire so that electrical charge flows between the reservoir and the remote target based upon the determined threat level of the situation.

Another aspect of the present disclosure relates to a conductive energy weapon (CEW). The CEW includes a battery and, a high voltage pulse generator electrically coupled to the battery. The CEW includes one or more conductive contacts electrically coupled to the high voltage pulse generator through a conductive wire for each conductive contact and a drive configured to propel the one or more conductive contacts from the CEW. The CEW includes an actuator configured to cause the drive to propel the one or more conductive contacts from the CEW. The CEW includes one or more sensors configured to send signal, and a controller configured to receive and process the signals from the one or more sensors to determine a threat level, wherein the controller sends a signal to the pulse generator to cause a train of pulses to the one or more conductive contacts that is proportional to the determined threat level.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. Moreover, analogous structures may be indexed in increments of one hundred. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The present disclosure relates to a hand-held conductive energy weapon (CEW) that provides an electric charge based upon one or more sensed or assessed threats. Because the CEW has one or more sensors that assesses a threat, the CEW is capable to assess where the present incident lays on a scale from protecting the target from himself or herself with no threat to the user of the CEW to protecting the user of the CEW from imminent bodily harm or death from the target's aggression. To the extent possible, the CEW is able to assess where the immediate incident is on this use-of-force gray scale, and adjusts its actions appropriately. One advantage of this measured response is that it optimizes the output of the CEW for the well-being of both the operator and the target.

The balanced-response concept of adjusting the electric charge to the sensed assessed threat can be utilized with any CEW. Exemplary CEW device that can utilize the balanced-response concept include superplastic metal extrusion, dart based electric contact, propulsion of liquid or molten conductive beams, batons that can be a fixed length or telescoping in nature and a laser to ionize one or more conductive channels in the air. Whatever the type of CEW, sensors and controls within the CEW are able to assess a threat level and deliver a proportional amount of electric charge to aid in dissipating the threat while protecting the well-being of both the operator and the target(s). By way of non-limiting example, the voltage, current, frequency of electrical pulses, dose duration, and number of electric pulses can be manipulated based upon the sensed threat. When using a CEW with superplastic metal extrusion technology, a rate of extrusion can also be manipulated based upon the sensed threat, which allows a sweep rate to be controlled.

In an exemplary, non-limiting example, the balanced-response concept is disclosed herein as being used with a CEW based upon superplastic metal extrusion. A CEW using superplastic material has the advantage that it is more difficult to miss the target. For example, if one of two beams are missing the target, the operator is capable of guiding the beams both onto the target, similar to directing water through a hose, or steering a flashlight beam. The ability to steer the metal beam may be one of the more important implementation advantage of superplastic metal extrusion over existing CEWs.

Further using the CEW using superplastic metal extrusion allows multiple targets to be quickly engaged. If the user sweeps the beams in horizontal arcs, several offenders per second can be electrically struck.

Under the right process conditions, solid metal (even room temperature metal) can be extruded to form solid wire at high speed, such as between about 10 meters/second and about 40 meters/second. Superplastic forming can be accomplished with aluminum alloys, though it is can also be done with titanium and iron alloys. However, by way of example, forming a 100 micron diameter wire at 30 meters/second is such an extreme case of superplasticity that an additional property of the metal appears to be important: lack-of-work-hardening. An exemplary lack-of-work hardening metal is indium and an indium-based alloy, such as an indium/tin alloy.

Figure 1:
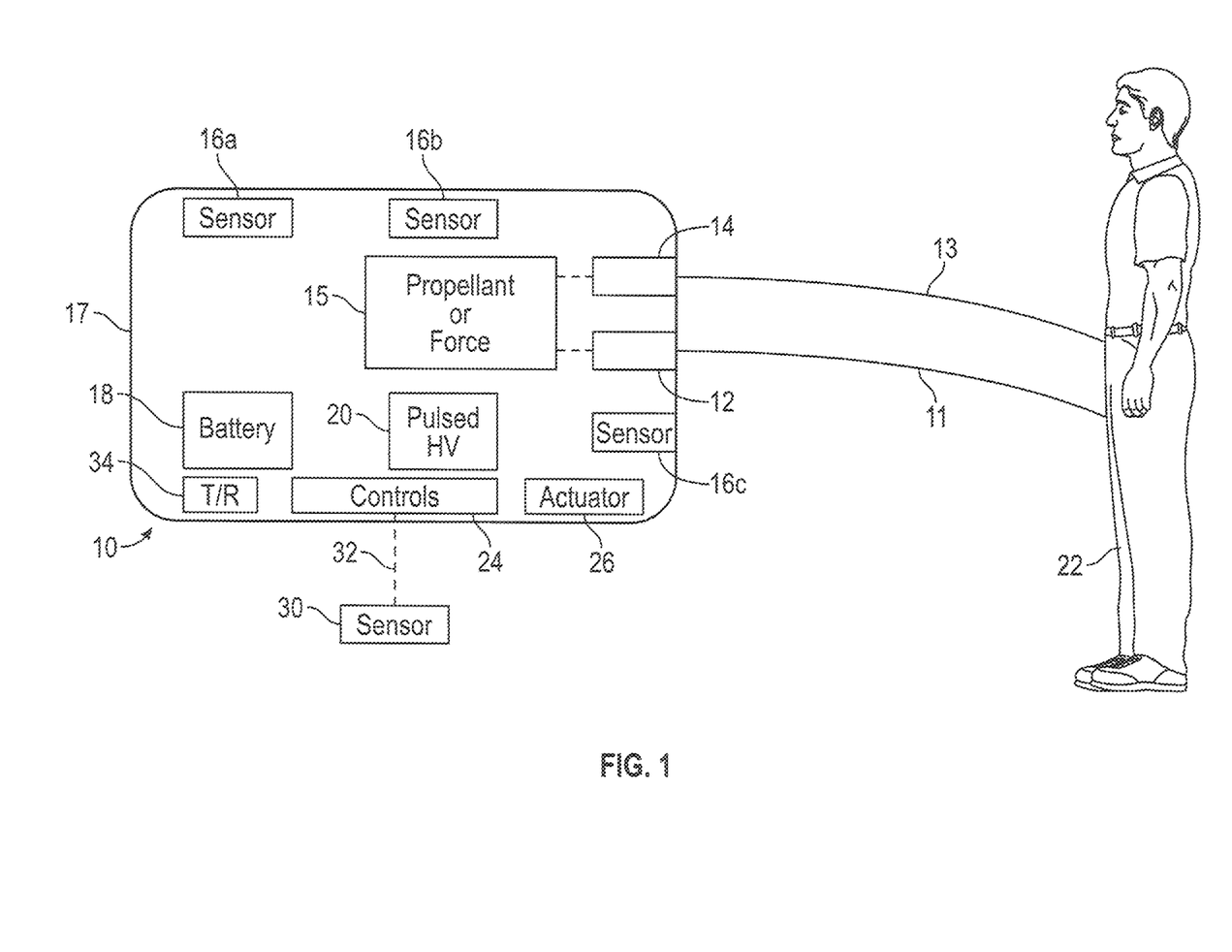
FIG. 1 is a schematic view of a hand-held conductive energy weapon.

A CEW of the present disclosure is illustrated at 10. The CEW 10 include first and second electrically conductive projectiles 12 and 14 contained within a housing 17. The conductive projectiles or electric contacts 12 and 14 include superplastic metal extrusion beams, dart based electric contacts propelled by springs or gunpowder, propulsion of liquid or molten conductive beams, batons that can be a fixed length or telescoping in nature and a laser to ionize one or more conductive channels in the air that are caused to be discharged by a propellant or a force 15 imparted on the projectiles 12 and 14.

The CEW 10 includes one or more sensors. As illustrated, the CEW 10 can include a plurality of sensors including but not limited to a gyroscope 16a, an accelerometer 16b, a beam current monitor (not shown), and video camera or a range finder 16c, such as a Lidar range finder. The gyroscope 16a and the accelerometer 16b can be one axis, two axis or three axis devices. However, any number of sensors and types of sensors can be utilized in the CEW to implement the balanced-response concept.

In some embodiments, the CEW 10 is equipped with a transmitter/receiver 34 configured to receive signals from one or more external sensors 30. The sensors 30 are wirelessly coupled to the receiver through a wireless connection 32 such as, but not limited to, a body camera, cameras mounted on physical structures such as buildings or poles, cameras on drones, a cellular telephone with GPS to provide the location of the user, a second CEW 10 being used by another person, thermal sensors that are typically in a building and array microphones that can be installed in cities to locate gunshots. However, other sensors external to the CEW 10 can communicate with and provide information to the CEW 10 to provide the balanced response to a threat. The external sensor 34 can be wirelessly coupled to the transmitter/receiver 34 by a wide area network (WAN) or a local wireless network, such as a Bluetooth® connection.

Additionally, the transmitter/receiver 34 can transmit information to other CEWs 10 or to personnel engaged in the threat situation or to others at a remote location. For instance, the determined threat level can be transmitted to other CEWs 10 and audio and video can be transmitted to interested third parties, such as law enforcement and elected officials. The CEW 10 includes a battery 18 that is in communication with high voltage pulse generator 20 that is configured to send a train of pulses through the projectiles 12 and 14 to a target 22. However, in situations where the CEW is mounted in a fixed location, such as in a building or structure, the power can be hard wired to the CEW.

The CEW 10 includes a controller 24 that receives signals from the sensors 16a, 16b and 16c and processes the received signals to aid in assessing a threat level. After the threat level is determined the controller 24 causes the high voltage pulse generator 20 to send a train of pulses through the conductive projectiles 12 and 14, typically through conductive wires 11 and 13 attached to the projectiles 12 and 14, in a measured response to the target 22.

The CEW 10 includes an actuator 26 that causes the projectiles 12 and 14 to be propelled toward the target 22. The user's interaction with the actuator 26 can provide feedback to the controller regarding the effectiveness of CEW 10 relative to the target(s), such as the amount of force placed on the actuator. By way of non-limiting example, a joystick controller can be utilized which can accept a physical input, such as pressure that can be sensed by the controller. An exemplary joystick is a joystick manipulated by the user's thumb. Alternatively, a trigger with a displacement or force sensor can be used or an actuator that receives a remote signal to cause the propellant or force to discharge the electric contacts Referring to FIG. 2, a CEW is illustrated at 10A. The CEW 10A includes substantially all of the elements of the CEW 10. However, the sensor 16c is a video camera, such as a two-dimensional video camera. The signals from the video camera 16c are sent to an image processor 17 that processes the signals from the video camera 16c. By way of non-limiting example, the video camera 16c can be utilized to determine the change in location of a target or targets, aid in determining whether the threat is charging toward the user of the CEW or retreating from the user of the CEW and/or determining a change of position of the target or targets. A change of position includes standing to sitting or laying down and the opposite where the target stands from a sitting or prone position. It should be noted that in some instances, detecting changes in a sequence of images may more readily determine the change of position of the target when compared to a static image analysis.

Figure 3:
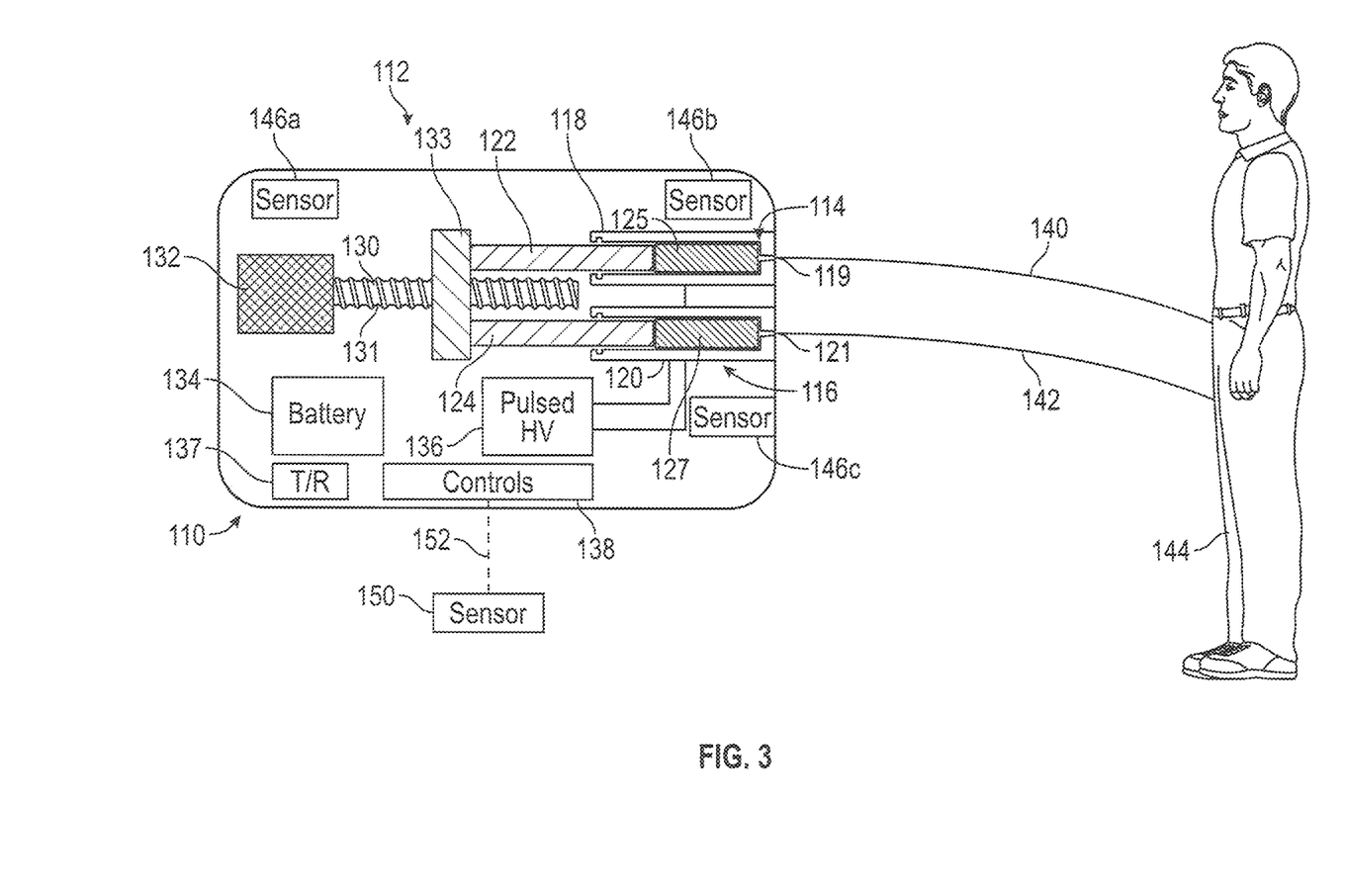
FIG. 3 is a schematic view of a cold, metal based extrusion of the hand-held conductive energy weapon.

An exemplary, non-limiting superplastic metal extruder is illustrated at 110 in FIG. 3. The CEW 110 has a housing 112 that retains first and second extruders 114 and 116 that include first and second barrels 118 and 120 and first and second pistons 122 and 124 that move within the barrels 118 and 120, a respectively.

Each barrel 118 and 120 is configured to retain a cylinder 126 and 128 of solid metallic material 125 and 127 that is extruded through extrusion tips 119 and 121 by forcing the pistons 122 and 124 into the barrels 118 and 120 with a drive 130 coupled to the pistons 122 and 124. The drive 130 is powered by a motor 132 that is suppling energy from a battery pack 134 within the housing.

The CEW 110 includes a plurality of sensors 146a, 146b and 146c that are utilized to assess a threat risk. The sensor 146a can be a three-axis gyroscope, the sensor 146b can be an accelerometer and the sensor 146c can be a range finder, such as a Lidar range finder. However, any number of sensors and types of sensors can be utilized in the CEW to implement the balanced-response concept.

The CEW 110 also includes a modulated high voltage generator 136 coupled to the battery pack 132 where the high voltage generator is electrically coupled to the first and second extruders. The high voltage generator 136 is configured to send pulses of high voltage electricity to a target 144 once engaged by extruded threads 140 and 142. Pulsing the voltage and current through the threads 140 and 142 optimizes the nervous system coupling for incapacitation without paralyzing muscles, which can occur with continuous direct current.

The CEW 110 also includes a controller 38 that controls at least the length of time the motor 132 is actuated, which in turn controls the length of time that threads 140 and 142 are extruded from the extrusion tips 119 and 121. If the motor 132 is a variable speed motor, the controller 138 can also control the rate of extrusion by controlling the speed of the motor 132. The controller 138 can also control the rate, length and duration of the pulses sent from the high voltage generator 136 to the target 144 through the threads 140 and 142.

The sensors 146a, 146b and 146c send a signal to a controller 138 which are used to determine a threat level. After the threat level is determined the controller 138 causes the high voltage pulse generator 136 to send a train of pulses through the beams 40 and 42 and/or control the extrusion rate of the beams 140 and 142.

In some embodiments, the CEW 110 is equipped with a transmitter/receiver 137 configured to receive signals from one or more external sensors 150. The sensors 150 are wirelessly coupled to the receiver through a wireless connection 152 such as, but not limited to, a body camera, cameras mounted on physical structures such as buildings or poles, cameras on drones, a cellular telephone with GPS to provide the location of the user, a second CEW 10, 10A and/or 110 being used by another person, thermal sensors that are typically in a building and array microphones that can be installed in cities to locate gunshots. However, other sensors external to the CEW 10 can communicate with and provide information to the CEW 10, 10A and/or 110 to provide the balanced response to a threat. The external sensor 150 can be wirelessly coupled to the transmitter/receiver 137 by a wide area network (WAN) or a local wireless network, such as a Bluetooth® connection.

Additionally, the transmitter/receiver 137 can transmit information to other CEWs 10, 10A or 110 or to personnel engaged in the threat situation or to others at a remote location. For instance, the determined threat level can be transmitted to other CEWs 10, 10A or 110 and audio and video can be transmitted to interested third parties, such as law enforcement and elected officials.

As illustrated in FIG. 3, the drive 130 is configured as a threaded engagement of threaded rod 131 coupled the motor and threadably engaging a threaded bore within a plate 133 attach to the pistons 122 and 124. Knowing the pitch of the threaded rod 131 and the rate of rotation and the duration of rotation allows the controller to determine velocity of the pistons 122 and 124 within the barrels 118 and 120. The velocity of the pistons provides feedback to the controller 138 such that drive force on the material and/or the extrusion pressure can be determined and controlled. Further, factoring in the duration of rotation, the cross-sectional area of the material and the cross-sectional area of apertures in the extrusion tips 119 and 121 allows the controller 138 to determine a velocity of the extruded thread, the length of the extruded thread and the amount of material remaining in the barrel 118 and 120 that remains available for extrusion. However, other drive mechanisms are within the scope of the present disclosure.

Further, as illustrated in FIG. 3, the power source for the CEW 110 is a battery pack 134 carried by the CEW. However, in situations where the CEW is mounted in a fixed location, such as in a building or structure, the power can be hard wired to the CEW.

In operation, a user of the CEW 110 locates a remote target 144 to be incapacitated. The operator causes the controller 138 which energizes the motor 132 and causes the drive 130 to rotate the threaded rod 131 which moves the plate 133. As the plate moves 133, the pistons 122 and 124 are driven into the barrels 118 and 120 which applies pressure to the metallic material 125 and 127. As pressure is applied to the material 125 and 127, the threshold pressure $P_t$ is reached, which causes shear through the nozzles 119 and 121, which raises the temperature of the material proximate the nozzles 119 and 121. The combination of the pressure and temperature proximate the nozzles 119 and 121 causes the threads 140 and 142 to be extruded at velocities that can, at times, penetrate clothing of the target 144, such that the high voltage generator 126 can send pulses of current along the threads 140 and 142 to provide an incapacitating, non-lethal amount of current to the target 144. However, typically the circuit is completed by a spark jumping from the thread 140 to the skin, and from the skin back to the other thread 142. The air ions generated by that spark create an ion channel that makes it much easier for subsequent pulses to complete the same circuit.

The threads 140 and 142 typically have a substantially circular cross-section. However, the threads 140 and 142 can have other cross-sectional configurations.

The CEWS 10, 10a and 110 are illustrated as hand-held, side arm CEWS. However, the mechanisms of the disclosed CEWS can be utilized in long arm CEWS, CEWS mounted to buildings or structures and/or mounted to aerial drones.

Figure 4A:
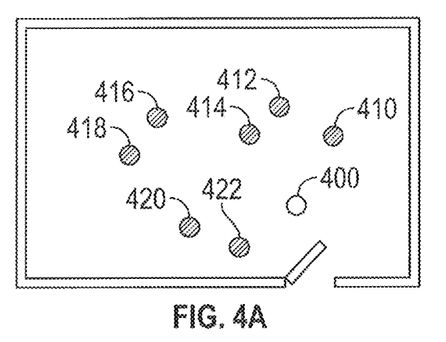
FIGS. 4A-4F is a schematic view of the conductive energy weapon being used on multiple targets in a room.
Figure 4B:
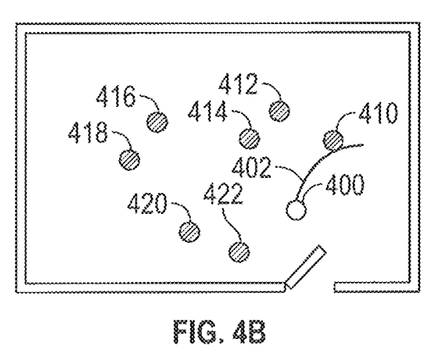
Figure 4C:
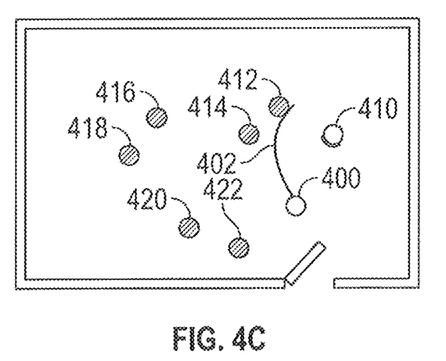
Figure 4D:
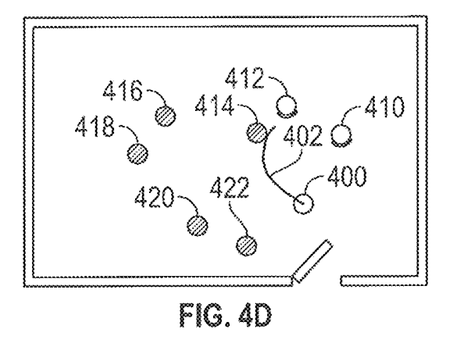
Figure 4E:
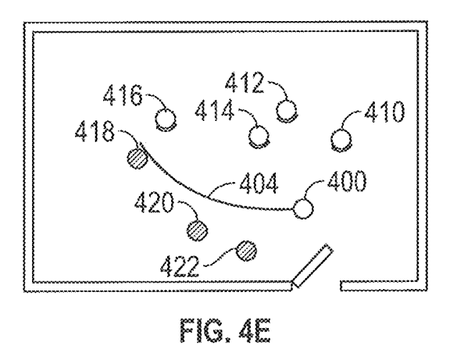
Figure 4F:
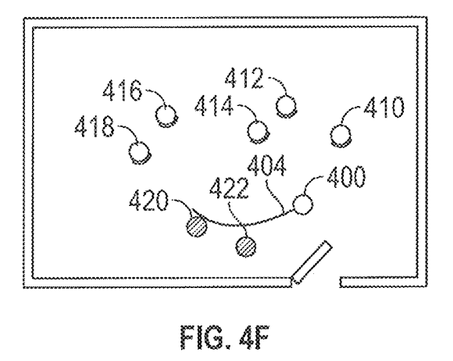

Referring to FIGS. 4A-4F, the CEW 110 is utilized to control a crowd in a 15'×20' room with seven aggressors arrayed around a CEW user. FIGS. 4A-F illustrate how a person with a single CEW of the present disclosure can incapacitate numerous targets with a single sweeping extrusion. In FIG. 4A, the user 400 enters a room with potential targets 410-422. After determining each target was a threat, the user 400 extruded a thread 402 and contacts target 410 in FIG. 4B, target 412 in FIG. 4C, target 414 in FIG. 4D, targets 416 and 418 in FIG. 4E and targets 420 and potentially target 422 in FIG. 4F. It is anticipated that the entire encounter that immobilized six or seven threats could be completed in less than two seconds.

Each of the CEWs 10, 110 include one or more sensors to acquire data that is used to assess the level of a threat. The CEW 10, 100, 150 then uses the assessed threat to vary the electric charge used on the target. However, the CEWs 10, 110 can include trigger and safety switches to act as overrides to automatic proportional response. No action is taken without both the trigger and the safety being activated. Manual escalation or de-escalation of the force level can be performed by manual indications and network interactions as well.

Figure 5:
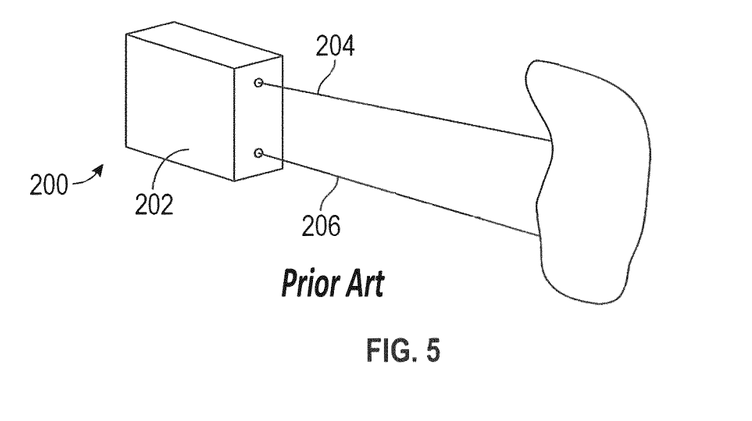
FIG. 5 is schematic view of a conductive energy weapon having a sensor for sensing current through extruded beams.

If, for example, multiple targets are being engaged, each for a shortened time, as in FIGS. 4A-4F, the beam current is more indicative of when beams are contacting a target than the pointing direction of the CEW. Since relatively high peak currents are required for the short contact durations, the energy in the pulse trains may be increased once contact is detected, and reduced subsequently, so that an inter-beam arc is not started when the beams break contact with a target. In some embodiments a current can be measured in the extruded beams to monitor the amount of energy delivered to a target. By way of non-limiting example, referring to FIG. 5, a sensor 202 in a CEW 200 determines current in the extruded beams 204, 206 and into the target 208. The current can be measured by voltage drop across a resistor, by transformed-coupled current measurement, by Hall effect, and by other known techniques.

In what follows, a plurality of sensors within the CEWs are discussed which can be used to assess the real time threat level of the environment, and how the CEW utilizes the assessed threat by the CEW to respond to that threat level. It is noted that the sensors are being described individually on a single CEW. However, any combination of sensors can be utilized on a single CEW.

Figure 6:
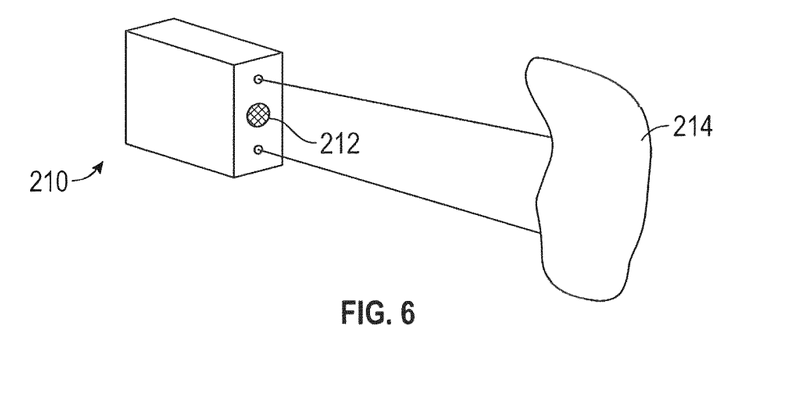
FIG. 6 is schematic view of a conductive energy weapon having an ultrasonic range sensor.

Referring to FIG. 6, a CEW 210 utilizes a range sensor 212, such as an ultrasonic range sensor. Ultrasonic range sensors 212 give real-time line-of-sight range data out to 20 feet and beyond of a target 214. The velocity of the target 212 can be derived from the rate of change of range. A negative velocity (toward the user) might express a higher threat level than a positive velocity (away from the user).

Figure 7:
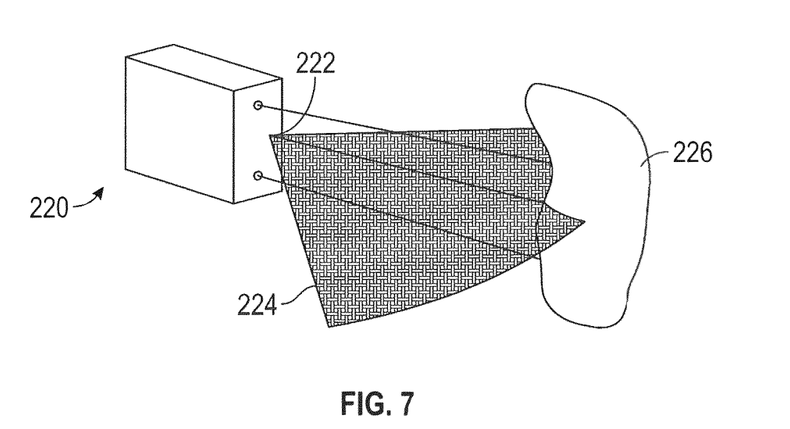
FIG. 7 is schematic view of a conductive energy weapon having a LIDAR ranging sensor.

Referring to FIG. 7, a CEW 220 includes another range sensor 222, such as a LIDAR range sensor. Lidar range sensors 222 provide roughly 1 inch resolution ranging out to 40 feet and beyond, often with the ability to scan in one or two dimensions. A lidar sensor with a positioning servo allows range to be monitored in the plane 224 of the line of sight to the target 226.

Figure 8:
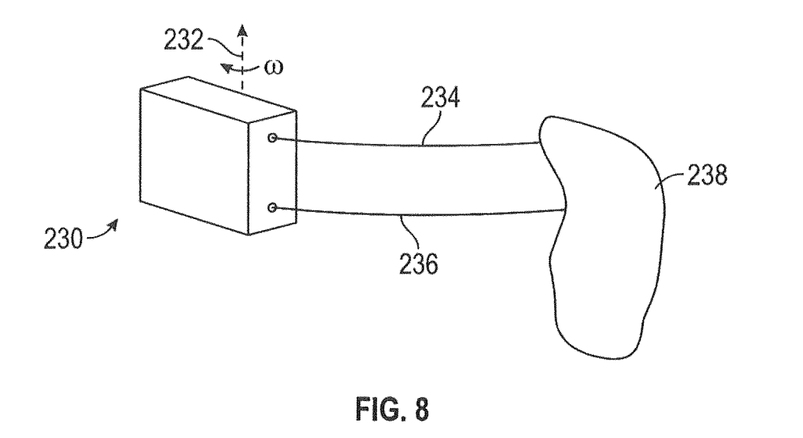
FIG. 8 is schematic view of a conductive energy weapon having a gyroscope for determining rotation of the conductive energy weapon.

Referring to FIG. 8, a CEW 230 is illustrated that utilizes an electronic gyroscope 232. The CEW desires to know the rate of change of the pointing direction, which can be provided, for example, by an electronic gyroscope 232. A typical gyroscope is a three-axis gyroscope. Combining the gyroscope 232 with line-of-sight ranging by sensors 212, 222 or any other line-of-sight sensor allows the CEW to construct a 2-D or 3-D range map. The gyroscope 232 provides rate-of-rotating information (available in up to 3 axes); a high sweep rate by the operator while launching beams 234, 236 is, for example, a likely measure of a high threat level by the target 238.

Figure 9:
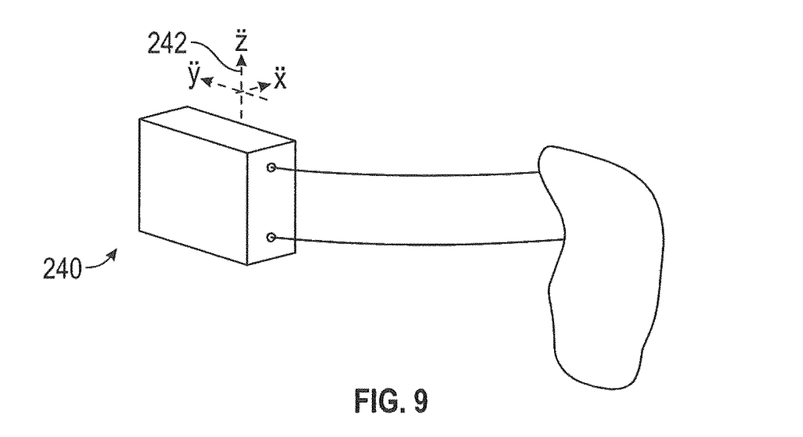
FIG. 9 is schematic view of a conductive energy weapon having an accelerometer.

Referring to FIG. 9 a CEW 240 includes an accelerometer 242 to determine inertial position changes of the CEW 240. Since the CEW 240 is not likely to be stationary during an incident, inertial position changes, as well as the 'down' direction can be determined. This data is valuable for generating a range map. Rapid motion of the CEW by the user also implies a higher potential threat level.

Figure 10:
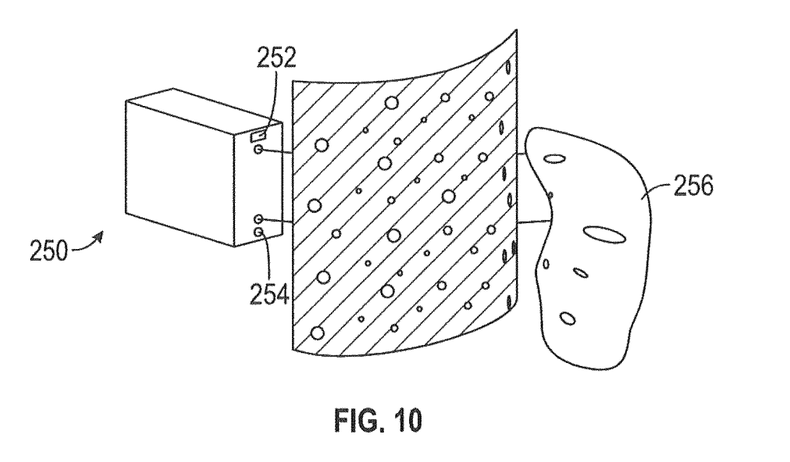
FIG. 10 is schematic view of a conductive energy weapon having a structured light range mapping sensor.

Referring to FIG. 10, a CEW 250 includes a structured light source 252 and a video camera 254 with post processing. The speed of this approach makes the structured light source 242 and the video camera 254 attractive for developing a 3D image of the incident area. Differences between sequential range images show candidate aggressors 256 along with their postures and velocities.

Figure 11:
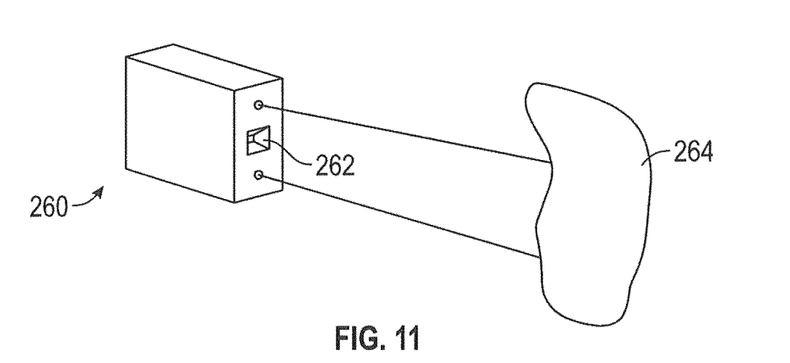
FIG. 11 is schematic view of a conductive energy weapon having a radar ranging sensor.

Referring to FIG. 11, a CEW 260 includes a short-range radar sensor 262. The short-range radar sensor 262 is effective in determining relative velocity of the target 264.

Figure 12:
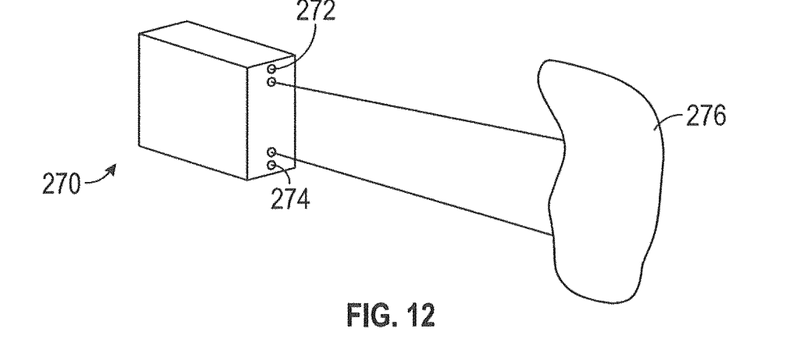
FIG. 12 is schematic view of a conductive energy weapon having a stereoscopic imaging

Referring to FIG. 12, a CEW 270 includes at least two video cameras 272 and 274. The plurality of video cameras 272 and 274 provide stereoscopic video. The stereoscopic video can generate 3D object maps from the differences between separated video images. Since the range information gets more precise the closer the target 276 is to the CEW 270, this type of sensor data can be desirable.

Figure 13:
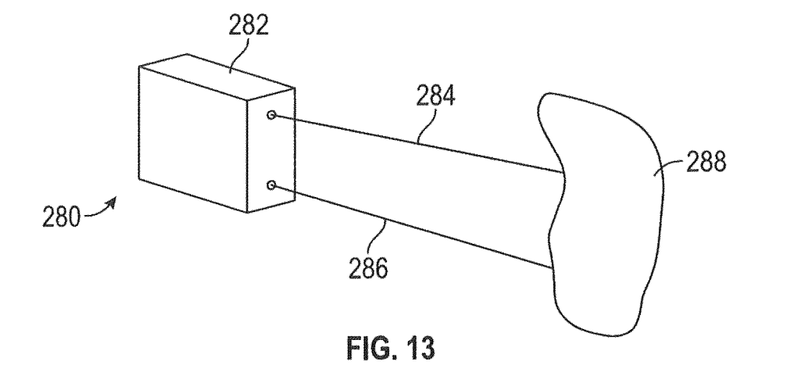
FIG. 13 is schematic view of a conductive energy weapon having a magnetic current loop ranging.

Referring to FIG. 13, a CEW 280 is illustrated having a sensor 282 that is configured to utilize magnetic current loop ranging of a target 288 engaged by two metal beams 284, 286 engaging the target 288. A completed circuit using the beams 284, 286 through a target 288 creates the magnetic current loop. The peak current rises and falls on the order of 10 us, so the associated broadcast wavelength is on the order of a kilometer. As such, the loop always appears small compared to the wavelength. As the peak currents tend to be on the order of an amp, significant RF power is radiated during the current pulses. By comparing the driven current (using a transformer-coupled resistor, or a Hall sensor, or similar device) through the beams 284, 286 with the RF signal received by a separate current loop antenna arranged to couple to the emission from the beam current loop, an estimate can calculated for the range of the target 288. The larger the received-signal to beam-current ratio is, the longer the range.

Figure 2:
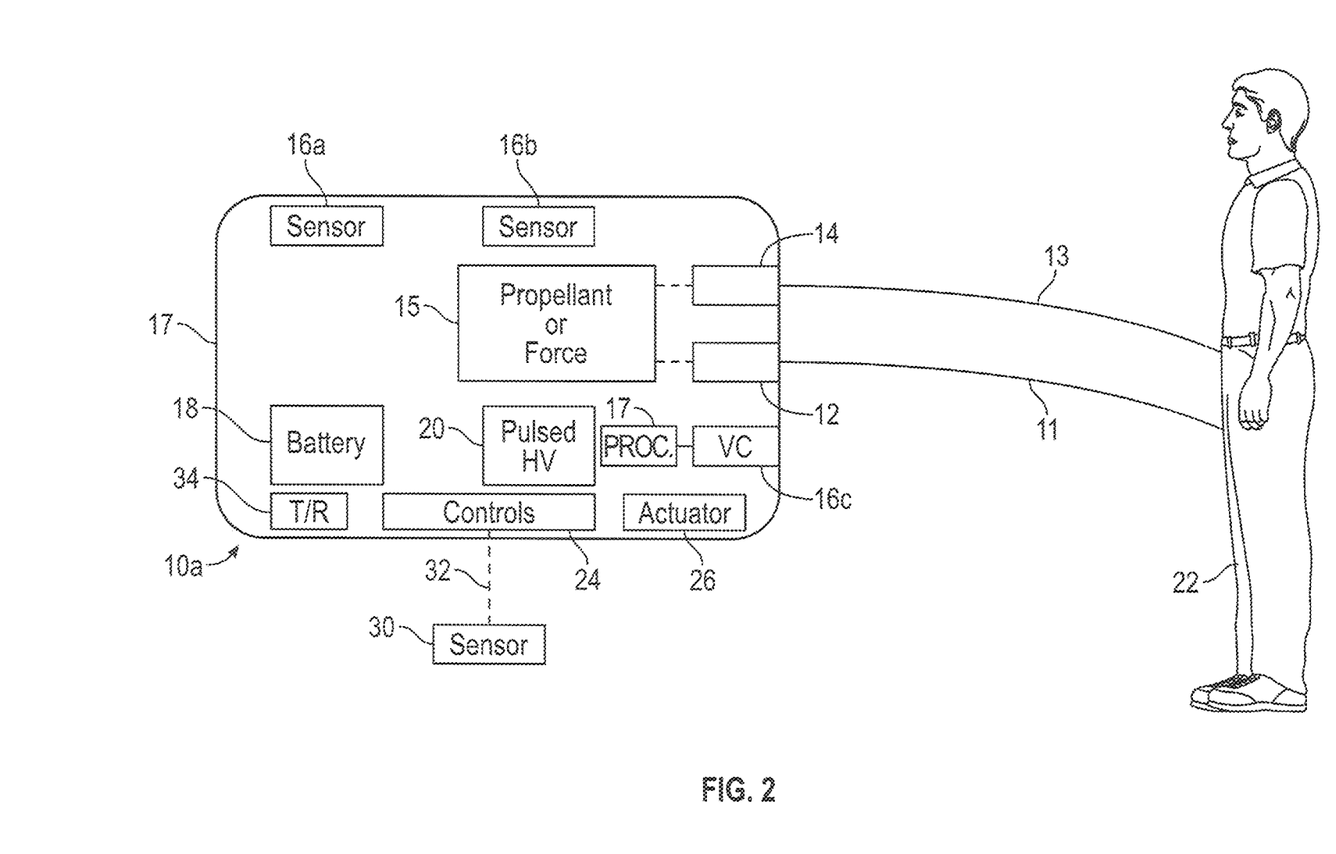
FIG. 2 is a schematic view of another hand-held conductive energy weapon.
Figure 14:
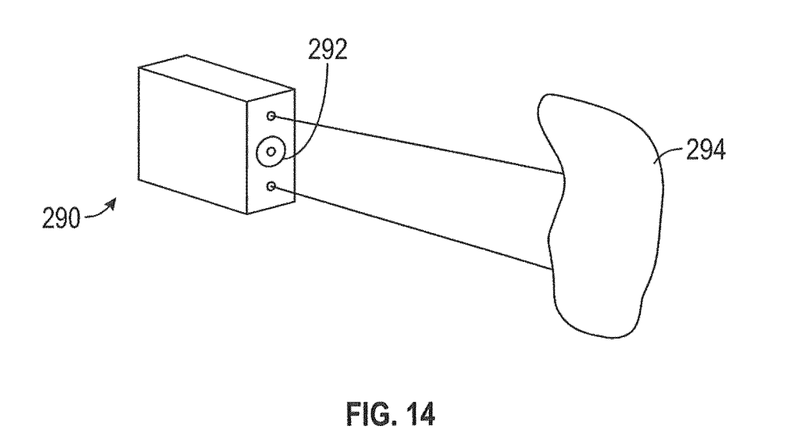
FIG. 14 is a schematic view of a conductive energy weapon equipped with a video camera configured to provide video to an image analyzer.

FIG. 14 illustrated a CEW 290 equipped with a front-facing video camera 292 and associated image processor (such as illustrated and described in FIG. 2). The combination of camera 292 and processor would remove the effects of pointing changes of the camera 292 with respect to its surroundings. The camera 292 and imaging processor detect changes over time in the resulting stabilized images, where those changes define a moving figure or target 294. The image processor would then attempt to extract information such as whether the target 294 is changing configuration (threat increasing as the vertical-to-horizontal aspect ratio increases) or size (threat decreasing as the target 294 retreats). The change in aspect/ratio or size is then used to aid in providing a proportional response to the detected threat.

Figure 15A:
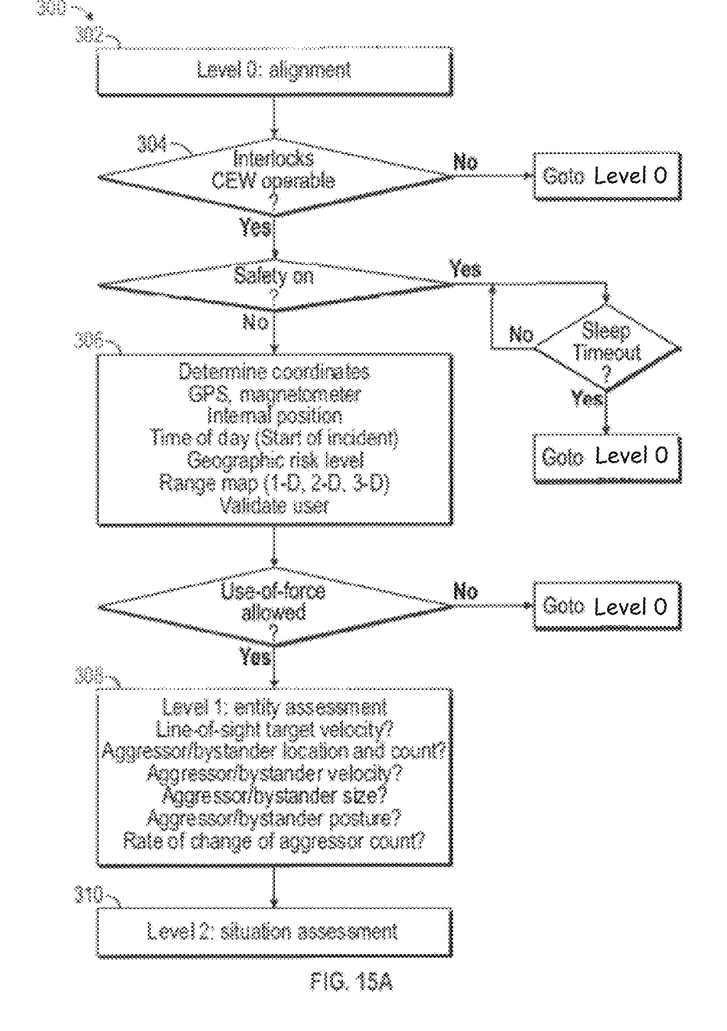
FIG. 15A is a flow chart illustrating steps taken prior to engaging a target with the conductive energy weapon.
Figure 15B:
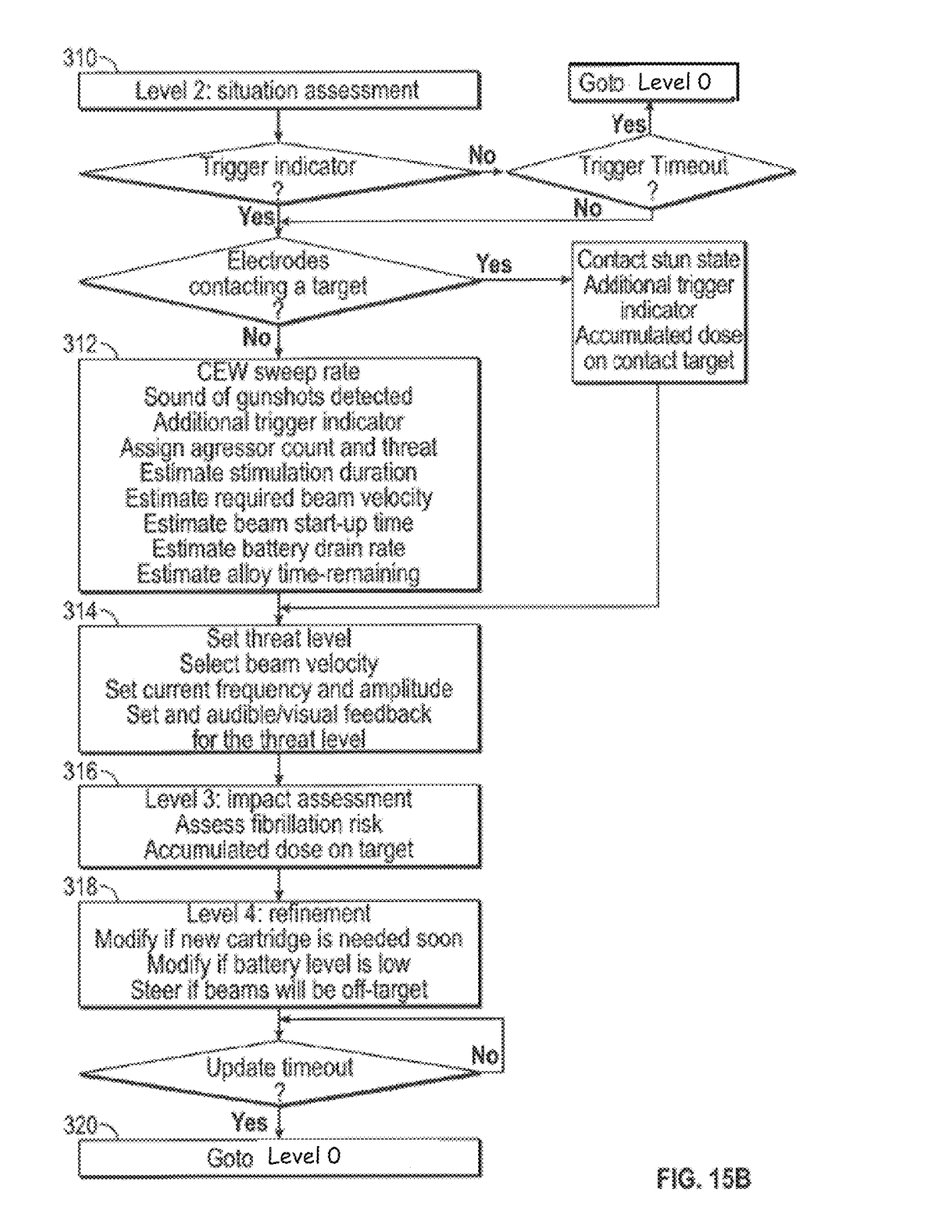
FIG. 15B is a flow chart illustrating steps taken while engaging a target with the conductive energy weapon.

Generally, the richer the sensor data, the better certainty is possible of the current threat situation. Sensor fusion where any combination of the disclosed sensors can be utilized in the CEW to generate situational awareness from raw data. FIGS. 15A and 15B provide flow charts that exemplify the utilization of one or more sensors to determining the response of an CEW to an ongoing incident.

Referring to FIG. 15A, the steps leading to a situational assessment is illustrated at 300. At step 302, an initial assessment or alignment is completed. At step 304, the user determines whether or not the interlocks, such as the safety is on or not or other interlocks are engaged. Once the safety is disengaged, coordinates of the situation are determined at step 306. The coordinates are determined by the sensors disclosed above and include, GPS by a magnetometer, inertial position, time of day of the incident, geographic risk level, range map, whether 1D, 2D or 3D, validation of the user and whether use of force is allowed.

Once use of force is determined to be allowed, the process moves to Level 1 at step 308. At Level 1, the entity or target is assessed by the sensor(s). The assessment includes, but is not limited to, line of sight target velocity, aggressor/bystander location and count, aggressor/bystander velocity, aggressor/bystander size, aggressor/bystander posture and/or rate of change of the aggressor count. Once the entity is assessed at step 308, the situation is assessed at step 310.

Referring to FIG. 15B, the situation assessment of step 310 is illustrated along with impact assessment, refinement and finally engaging the target(s). At step 310, the trigger indicator is determined and the electrodes are launched or extruded if the fixed electrodes on the front of the CEW are not already making contact. At step 312, a determination is made whether beams or darts are contacting the target. If the beams are contacting the target, the stun state, additional trigger indicator is referenced and accumulated dose of electric energy is monitored on the contact target.

Whether or not the beams are contacting the target in step 312, the sensors are used to determine one or more of CEW sweep rate, sounds of gunshots detected, additional trigger indication, assigned aggressor count and threat level, estimated stimulation duration, estimated required beam velocity, estimated beam start up time, estimated battery drain rate and estimated time of material in chamber. At step 314, the threat level is set, the beam velocity is selected, the current frequency and amplitude is set and audio/visual feedback is set for the threat level.

At step 316, the impact assessment (Level 3) is determined. The impact assessment includes assessing fibrillation risk and accumulated electric charge dosing on the target(s).

At step 318, the refinement determinations (Level 4) is determined. The refinement determinations include, but are not limited to, modifying the extrusion of the beams if a new cartridge is required to complete action, if the battery level is low and the steering of beams off target.

At step 320, it is determined whether the CEW has timed out. If yes, CEW reverts to a Level 0 mode. The steps in FIGS. 15A and 15B allows the user to utilize the sensed risk assessment to automatically adjust the electric energy dosage to the target.

The CEW operating system is an endless loop, starting with Level 0 at step 302. When the safety is on, the processor is held asleep for a time period. When the time period finishes, the processor wakes up and checks the safety again, conserving battery power.

When the safety is off, the CEW is placed in active incident state. If the state of the safety has just changed, an incident timer is started. If GPS is available, the coordinates are recorded. If inertial accelerometers or gyros or tilt meters are available, the local orientation, velocity, acceleration, angular velocities, and angular accelerations of the CEW are recorded. If risk data associated with the time of day or geography are available, they are noted. If 1-D range data is available, the range and relative velocity and acceleration of the in-line target is noted. If 2-D range data is available, the 1-D version is extracted, and the location and velocity of candidate targets (aggressors or bystanders) is noted. If 3-D range data is available, the 2-D version is extracted, and the size and posture of the candidate targets is noted. The proper user is validated, and a check is made whether there are restrictions in place on the use of force, whether for this use, this location, or this time of day. This data is acquired in step 306

If use-of-force is allowed, processing proceeds to Level 1 at step 308. For the line-of-sight target, as well as the surrounding aggressors/bystanders (if that data is available), a determination for each target is made as to its threat level. There are many ways this determination can be calculated; what follows is an example of the principle.

$$Threat_n = \\ a_0 s_{gs} + a_1 trig - a_2 \ddot{r}_n - a_3 \dot{r}_n - a_4 r_n + a_5 A_n + a_6 o_n + a_7 \omega^2 \quad \text{(Equation 1)}$$

$\alpha_0$ through $\alpha_6$ are positive coefficients. $s_{gs}$ is a signal that increases from zero with the likelihood that a gunshot sound has been detected during the incident. trig is increases as the trigger pull force or travel increases. $r_n$ is the radial range to the nth target; $\dot{r}_n$ and $\ddot{r}_n$ are the related velocities and accelerations. $A_n$ is the apparent area of the target, normalized to its range. $o_n$ is the orientation of the target, where $-1$ is apparently-prone and 1 is apparent-standing-vertically. $\omega$ is the current rotational sweep rate of the CEW. The coefficients are selected so that, if the target is some combination of being small, distant, prone, or moving away, $Threat_n$ for that target will be negative, and the target is considered a bystander. Conversely, if there have been gunshots, if the trigger is being pulled vigorously, if the CEW is being swept quickly, if the target is close or charging or accelerating towards the user, $Threat_n$ will be relatively large and positive. In this scenario, the total threat level is the sum of the individual threat levels.

There is a special case where the CEW is being pressed into contact with a target previously discussed at step 312. In this contact stun state, most of the situation assessment is mute, and the threat level is set to a default positive value.

Table 1 below indicates how different situation considerations are associated with sensor data.

TABLE 1

| Weight | Metric | Sensors |
|---|---|---|
| 13 | Contact electrodes in use | Ultrasonic/force/current |
| 12 | Sound of gunshots | Microphone |
| 11 | Velocity of aggressor(s) w.r.t. the operator | TOF/SL/ultrasonic/LIDAR/RADAR/video |
| 10 | Number of aggressors involved in the incident | TOF/SL/ultrasonic/LIDAR/RADAR/video/gyro/accelerometer |
| 9 | Rate of change of the number of aggressors | TOF/SL/ultrasonic/LIDAR/RADAR/video/e-gyro/accelerometer |
| 8 | Range of aggressor(s) w.r.t. the operator | TOF/SL/ultrasonic/LIDAR/RADAR/video |
| 7 | Size of the aggressor(s) | Video/LIDAR |
| 6 | Posture of the aggressor(s) | Video/LIDAR |
| 5 | Rate of change of the posture of the aggressor(s) | Video/LIDAR |
| 4 | Number of non-combatants involved in the incident | TOF/SL/ultrasonic/LIDAR/RADAR/video |
| 3 | Duration of the incident | — |
| 2 | Geography of the incident | GPS/LAN/Wi-Fi |
| 1 | Time of day of the incident | — |

The superplastic extrudate is propelled out of the CEW if the threat level is greater than zero. The commanded velocity of extrusion is determined by the target range and the rate of sweep of the CEW, where $b_i$ are scaling coefficients:

$$V_{beams} = v_o + b_1 r_n + b_2 \dot{r}_n + b_3 \omega^2 \quad \text{(Equation 2)}$$

When the alloy chambers empty, a reload cycle is required. For example, in the revolver configuration, the pistons are quickly withdrawn, the revolver cylinder is advanced, and the pistons are pressed through the new seals into contact with new alloy slugs. This action is automatically performed during extrusion when the operating system detects the requirement.

The current pulse frequency is selected as follows, where $c_2$ is a scaling coefficient:

$$f_{pulse} = f_0 + Threat_n \Delta f_1 + \omega^2 c_2 \quad \text{(Equation 3)}$$

The pulse frequency has an upper limit imposed of about 60 Hz, or well into the tentanic regime. The pulse frequency lower limit is about 5 Hz. A typical low-level stationary threat might produce a pulse rate of 20 Hz.

The charge transmitted per pulse is selected as follows, where $d_2$ is a scaling coefficient:

$$C_{pulse} = C_0 + Threat_n C_1 + \omega^2 r d_2 \quad \text{(Equation 4)}$$

The lower limit charge is 0.03 millicoulombs. A typical low-level stationary threat might produce a charge-per-pulse of 0.1 millicoulombs. If the CEW is being swept quickly and the target is at long range, so that the engagement time might be 0.1 seconds, the charge-per-pulse might be 1 millicoulomb.

The target beam currents are the target charge per pulse divided by a normalized pulse duration. Shorter pulse durations require higher drive voltage, allowing better clothing penetration, but risking arcing between the beams. Typical pulse durations are between 1 usec and 30 usec; pulse duration tends to be a characteristic of the drive circuit. These are provided at step 314.

It is useful to the operator, the bystanders, and the aggressors to know the threat level that the CEW has perceived. This information can be broadcast in synthetic speech, in a modulated siren, and/or in the intensity/color/flashing rate of lights.

With the threat levels, target beam currents, and commanded beam velocities are determined, processing proceeds to Levels 3 and 4 (Steps 316 and 318). If a target has been receiving stimulation for several seconds, the current level can be reduced. If the beams might be contacting the center of mass of the target in a manner that is more likely to produce fibrillation, the current level can be reduced (Step 316).

If new alloy cartridges or loads might be needed in the next several seconds, the extrusion velocity might be reduced. If the battery gas gage indicates that the batteries are low, the extrusion velocity and the current pulse drive frequency might be reduced. If the CEW is relatively stationary, the beams are oriented to miss a near-on-axis target, and there are torque converters on board to allow the angular orientation of the CEW to be adjusted, the operating system might steer itself so that the beams intercept the target.

At this point, sensor data fusion is complete. The superplastic extrusion velocity and beam current pulses are generated as commanded, and the operating system returns to repeat the analysis process at step 320.

The real-time threat assessment by the operator, indicated, for example, by the vigor of the trigger pull, can be stored together with the threat assessment of the CEW to give a more complete record of a use-of-force incident. A 3-D map of aggressors and bystanders is particularly useful in reconstructing the situation. The beam velocities, current pulse frequencies, and pulse charge levels should be recorded as well.

The present disclosure has described proportional response in with respect to a metal extrusion-based CEW. However, the proportional response devices, sensors and methods are not limited to a metal extrusion-base CEW. Rather, the proportional response devices, sensors and methods can be utilized with any CEW, including, but not limited to CEWs that deliver current using a plurality darts, propelled by gunpowder, each of which tows insulated electrode wire from spools in the launcher, such as those sold under the TASER® designation.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A method of delivering an electric charge to a target with a CEW, the method comprising:
   using one or more sensors in communication with the CEW to determine a threat level of a situation;
   contacting the target with at least one electrode wire discharged from the CEW; and
   applying electric energy to the target along the at least one electrode wire so that electric energy flows between the CEW and the target that is proportional to the determined threat level of the situation.

2. The method of claim 1, and further comprising propelling a dart attached to the at least one electrode wire, wherein the dart is configured to engage the target.

3. The method of claim 1, wherein contacting the target with the at least one electrode wire comprises contacting the target with two spaced apart electrode wires.

4. The method of claim 2, and further comprising attaching a dart to each of the two conductive electrode wires, wherein each dart is configured to engage the target at spaced apart locations.

5. The method of claim 1, wherein the step of discharging the at least one electrode wire comprises:
   pressurizing a reservoir of metallic conductor initially at a temperature below its melting point; and
   flowing the metallic conductor through an orifice to form an uninsulated continuous wire with axial velocity, so that a user might direct the axial velocity of the wire to intercept the remote target.

6. The method of claim 1, wherein the step of discharging the at least one electrode wire comprises utilizing gunpowder or springs.

7. The method of claim 1, wherein the one or more sensors comprises:
   a device configured to capture a series of images;
   a processor configured to process the series of images;
   a gyroscope;
   and an accelerometer.

8. The method of claim 1, wherein one or more of voltage, current, frequency of electric pulses, duration and number of electric pulses is adjusted based upon the determined threat level of the situation.

9. The method of claim 1, and further comprising:
   utilizing an actuator to cause the at least one uninsulated electrode wire discharged from the CEW; and
   sensing an amount of pressure on the actuator to provide feedback regarding the effectiveness of the CEW on the target.

10. The method of claim 1, and further comprising:
   transmitting and receiving information or communications between the CEW to a remote third party regarding the threat level of the situation.

11. The method of claim 1, and further comprising:
   moving the CEW as at least one uninsulated electrode wire discharged from the CEW to cause the at least one electrode to move in a non-linear path when the determined threat level indicates a plurality of targets such that at least two of the plurality of targets are contacted with the at least one electrode wire.

12. The method of claim 1, and further comprising:
   adjusting a velocity of the at least one electrode wire discharge from the CEW based upon the threat level of the situation.

13. A method of delivering an electric charge to a target with a CEW, the method comprising:
   using a device configured to capture a series of images, an processor configured to process the series of images, a gyroscope and an accelerometer in the CEW to determine a threat level of a situation;
   contacting the target with two spaced apart electrode wire discharged from the CEW; and
   applying electric energy to the target along the at least one electrode wire so that electric energy flows between the CEW and the target that is proportional to the determined threat level of the situation.

14. The method of claim 13, and further comprising attaching a dart to each of the two conductive electrode wires, wherein each dart is configured to engage the target at spaced apart locations.

15. The method of claim 14, wherein the step of discharging the at least one electrode wire comprises utilizing gunpowder or springs.

16. The method of claim 13, wherein the step of discharging the at least one electrode wire comprises:
   pressurizing a reservoir of metallic conductor initially at a temperature below its melting point; and
   flowing the metallic conductor through an orifice to form a continuous uninsulated wire with axial velocity, so that a user might direct the axial velocity of the wire to intercept the target.

17. The method of claim 13, wherein one or more of voltage, current, frequency of electric pulses, duration and number of electric pulses is adjusted based upon the determined threat level of the situation.

18. The method of claim 13, and further comprising:
   adjusting a velocity of the at least one electrode wire discharge from the CEW based upon the threat level of the situation.

19. The method of claim 13, and further comprising:
   utilizing an actuator to cause the at least one electrode wire discharged from the CEW; and
   sensing an amount of pressure on the actuator to provide feedback regarding the effectiveness of the CEW on the target.

20. The method of claim 13, and further comprising:
   transmitting or receiving information between the CEW to a remote third party regarding the threat level of the situation.

* * * * *